United States Patent [19]
Cook

[11] Patent Number: 5,251,301
[45] Date of Patent: Oct. 5, 1993

[54] COMPUTER REMOTE CONTROL THROUGH A VIDEO SIGNAL

[75] Inventor: Gary M. Cook, Pepperell, Mass.

[73] Assignee: PC Connection, Inc., Marlow, N.H.

[21] Appl. No.: 888,043

[22] Filed: May 22, 1992

Related U.S. Application Data

[60] Continuation of Ser. No. 711,267, Jun. 4, 1991, abandoned, which is a continuation of Ser. No. 506,858, Apr. 9, 1990, abandoned, which is a division of Ser. No. 199,624, May 27, 1988, Pat. No. 4,920,503.

[51] Int. Cl.[5] .................... G06F 15/16; H04N 7/08
[52] U.S. Cl. ................... 395/200; 395/163; 395/162; 395/325; 358/142; 358/146; 358/903
[58] Field of Search .............. 395/200, 325, 275, 163, 395/162, 154; 358/903, 142, 146, 147, 86

[56] References Cited

U.S. PATENT DOCUMENTS

| | | | |
|---|---|---|---|
| 3,993,861 | 11/1976 | Baer | 358/142 |
| 4,186,413 | 1/1980 | Mortimer | 358/146 |
| 4,368,486 | 1/1983 | Degoulet et al. | 358/146 |
| 4,380,027 | 4/1983 | Leventer et al. | 358/147 |
| 4,593,374 | 6/1986 | Gurumurthy | 364/900 |
| 4,630,231 | 12/1986 | Hirata et al. | 364/900 |
| 4,807,031 | 2/1989 | Broughton et al. | 358/142 |
| 4,875,096 | 10/1989 | Baer et al. | 358/143 |
| 4,894,789 | 1/1990 | Yee | 364/521 |

OTHER PUBLICATIONS

Crosstalk XVI (Software Manual), 1984, Sections 12.0–12.4, pp. 92–95.

*Primary Examiner*—Gary V. Harkcom
*Assistant Examiner*—Raymond J. Bayerl
*Attorney, Agent, or Firm*—Bromberg & Sunstein

[57] ABSTRACT

A system for simultaneously using a video signal to provide a video picture and computer data. At the transmitting end, a video signal is digitized and then modified by substituting digital signals representative of computer data for those representative of video pixels. The modified signal is reconverted to an analog signal and transmitted to a receiver. The receiver displays the video picture corresponding to the modified signal and extracts the computer data so that they may be provided to the computer. The computer can thus be controlled by the computer data as the video picture is being displayed.

21 Claims, 5 Drawing Sheets

COMPUTER REMOTE CONTROL THROUGH A VIDEO SIGNAL

This is a continuation of copending application Ser. No. 07/711,267 filed on Jun. 4, 1991, now abandoned, which is a continuation of Ser. No. 07/506,858 filed on Apr. 9, 1990, now abandoned, which is a divisional of Ser. No. 07/199,624 on May 27, 1988, now U.S. Pat. No. 4,920,503.

BACKGROUND OF THE INVENTION

The present invention is directed to a system for simultaneously using a video signal to send data to a computer and to display a video picture. In particular, the data sent to the computer may be used to control the computer.

Along with the expanding market for new computer software programs, has emerged the use of broadcast and closed circuit television to either demonstrate or teach the use of such new programs on computers. This can be especially valuable for software programs which may be used by personal computers commonly found in the homes of consumers. In filming such a program it is very difficult to obtain a clear picture of the video screen from a computer monitor being used to demonstrate the computer program. It is an object of the present invention to permit a television program to be broadcast simultaneously with software or computer control data which can be transmitted to and received by a computer attached to a television being viewed.

There are a number of systems which have been developed to send computer data by way of a video signal. In U.S. Pat. No. 3,984,624, Waggener discloses a video system in which a single digital bit is combined with a horizontal scan line of an analog video signal. The bit is added at a predetermined location on a scan line and those predetermined locations are varied in order to prevent visible deterioration of the video picture. In Waggener, the digital bit is superimposed on the analog signal.

In U.S. Pat. No. 4,413,281, Thonnart discloses a method for sending telatext simultaneously with an analog television signal. In U.S. Pat. No. 4,368,486, Degoulet, et al. disclose a system for superimposing a marking code on televised video pictures. Detection of this code may be required so that programs are only displayed at receivers that have requested or paid for the program. In U.S. Pat. No. 3,691,295, Fisk discloses a system in which digital data can be sent from the end of a cable having a television display device back through the cable to the other end of the cable from which the video source has been provided. The digital data can be taken off of the video signal on the coax cable and received at the video source. The digital data supplied by risk is superimposed on the video's signal.

In U.S. Pat. No. 4,530,048, Proper discloses a controller which can be used to employ a video cassette recorder as a digital storage device.

SUMMARY OF THE INVENTION

The present invention is directed to a system including a transmitter and a decoder for using a video signal to simultaneously provide a video picture and computer data. The transmitter takes an analog video signal and digitizes it. The digitized video signal is modified by substituting digital signals representative of software data or computer control data for several of the digital signals representative of pixels on a video screen. The substituted signals are either black or white to represent either a 1 or a 0. The digital signal representing a single bit replaces a plurality of pixels in the video screen. Preferably, the computer data is provided on a vertical column on a side of the video display screen.

The modified digitized video signal is reconverted to an analog video signal and transmitted through the airways or recorded onto a video tape. At the receiving end of the transmission, or when playing back the video tape, the reconverted analog video signal is displayed on a television screen or monitor. The video picture corresponds precisely to the original video signal except that there is a black and white column along one side of the picture as a result of the computer data. The reconverted analog video signal being received or played back is provided to a decoder circuit which converts it to a digital signal. The portions of the digital signal representative of the computer data are extracted from the received digital signal. A processor translates the extracted digital signals into bytes of data. The bytes of data are stored, checked for corrections and then sent through an interface to a computer.

In order to extract the digital signals representative of the computer data, the decoder includes a horizontal sync detector and a timer which counts out predetermined time periods following a horizontal sync pulse. At the expiration of each predetermined time period, the received digital signal is clocked into a shift register. Preferably, one byte of computer data is sent on a single horizontal scan line. A byte is comprised of eight bits and each bit is represented by seven or eight pixels. From each horizontal scan line containing computer data, eight bits are extracted, one for each of the eight bits of computer data which was sent on the line. After the eight bits have been clocked into the shift register, they are read out by the processor.

The system of the present invention advantageously permits the simultaneous operation of a computer in a viewer's home or business location along with the showing on the television screen of a demonstration of the computer program being performed on the computer. The present invention further permits sending of a demonstration computer program over a video signal to numerous viewers. By providing immediate access to an unlimited number of potential customers, significant marketing advantage is achieved over the conventional distribution channels. Thus, a computer program can be distributed and demonstrated from one central location all over the country and the world via television satellites or by direct broadcast or cable. Also, the broadcast may be distributed by prerecorded means such as videotape.

Other objects and advantages of the present invention will become apparent from the following description of the presently preferred embodiment taken in conjuction with the drawings.

DETAILED DESCRIPTION OF THE PREFERRED EMBODIMENT

Figure 1:
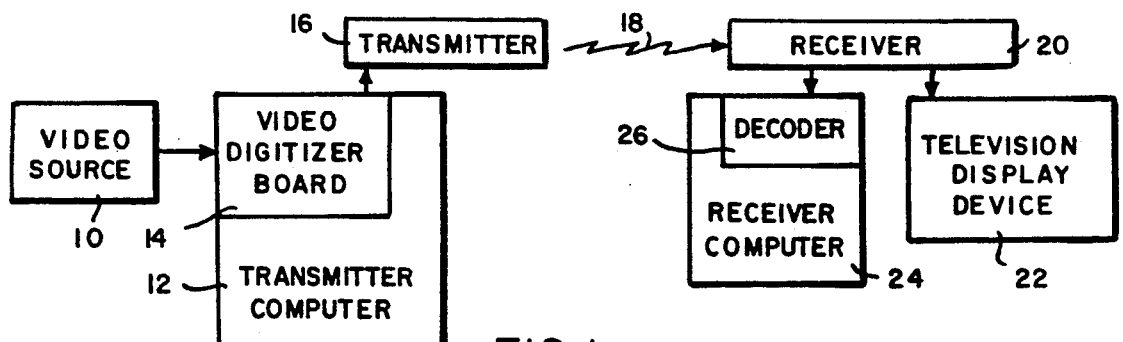
FIG. 1 is a schematic block diagram of the system of the present invention.

Referring now to the drawings, FIG. 1 gives an overview of the components of the system of the present invention. A video signal is provided by a source 10 to a computer 12 at the transmitter end of the system. The transmitter computer 12 includes a video digitizer board 14. Any appropriate digitizer board 14 may be used, however, the presently preferred embodiment makes use of the AT&T Targa 16 board. The video signal is provided directly to the digitizer board 14 where the signal is digitized. In the digitized signal, each pixel of the display screen is represented by two bytes, of which fifteen bits identify the color of that pixel.

The transmitter computer 12, in accordance with the present invention, reserves a portion of the screen in a vertical column along the side of the video picture for sending data to a receiver computer. Each bit of data is represented by seven or eight pixels. The seven or eight pixels are replaced by all 1's or all 0's in the digitized board 14. The 1's or 0's cause the pixels to appear either white or black. The thus modified digitized video signal is reconverted to an analog signal and provided to a transmitter 16 for sending out over a video signal communication link. The communication link 18 may be a satellite link, a cable, an ordinary antenna link or any combination of these or other commonly used video communication links. Alternatively, the converted analog signal may be recorded on a video tape or disc.

A conventional receiver 20 picks up the video signal and provides it both to a television display device 22 and a receiver computer 24. The picture displayed on the television display device 22 will appear essentially as the video picture provided by the video source 10, except that when the transmitter computer 12 adds computer data to the video signal, a column of black and white pixels appears on a side of the television screen. The receiver computer 24 includes a decoder board 26 for extracting the computer data being sent. The decoder board 26 forms the bits of data as they are received into data bytes. These bytes may be information for filing in the receiver computer 24 or they may be control instructions for the computer. For example, the data may represent a keystroke or other form of computer input.

Figure 2:
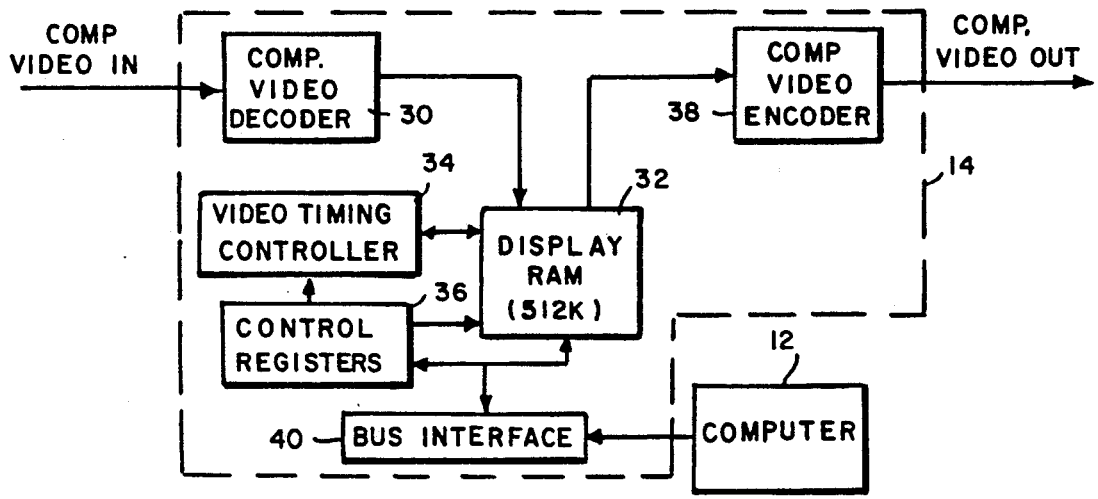
FIG. 2 is a schematic block diagram of the transmitter portion of the system of FIG. 1.

The transmitting portion of the system is discussed in more detail with reference to FIG. 2. A block diagram of the digitizer board 14 is shown. In particular, the AT&T Targa 16 schematic is provided as the digitizer board 14. The video signal enters a composite video decoder 30. Here, the video signal is translated into two bytes for each pixel such that the two bytes represent the color of that pixel on the video display screen. All of these bytes are stored in the display RAM 32. In the AT&T Targa 16, the display RAM 32 contains 512K bytes of memory. This provides sufficient storage for a display screen having 512×400 pixels. A video timing controller 34 and control registers 36 monitor the timing as the video decoder 30 loads the display RAM 32. Conventionally, an entire display screen is loaded into the display RAM 32 every one thirtieth of a second. The control registers 36 provide an indicator when that one thirtieth of a second has elapsed. The control registers 36 also include a raster row counter which count down as the decoder fills each horizontal line of pixels.

A bus interface 40 provides the ability for the digitizer board 14 to communicate with a computer 12. The display RAM 32 includes an overlay bit for each pixel of the display. The overlay bit may be set either to permit the composite video decoder 30 to load the video pixel into the display RAM or may be set so as to prevent loading of the video pixel into the RAM. When the computer 12 wants to broadcast data through the video signal, it will set the overlay bits for the data portion of the screen so as to prevent loading of the video signal. In accordance with the presently preferred embodiment, data is provided in the pixels which form a column on the side of the video picture. Preferably, this column is on the left hand side immediately following the horizontal sync signals.

A complete video screen is composed of 262 horizontal lines. According to the presently preferred method, lines 1-20 are not used for data, lines 21-248 are divided into four equally sized packets, and lines 249-262 are not used for data. On each horizontal line on which data appears, exactly one byte of information is sent. A byte is made up of eight bits and each bit is represented by either seven or eight pixels. In the case where bit seven is the most significant bit and bit zero is the least significant, bits seven, five, two and zero are eight pixels and bits six, four, three and one are seven pixels. Each pixel is represented by two bytes which for the data indicate either black or whits and are thus either all 1's or all 0's.

The computer 12 provides the white or black indicating bytes for the pixels which have been reserved for data. The one thirtieth of a second which is required to send a full video screen is sufficient for the computer 12 to replace the pixels dedicated to the data with the desired white or black indicating bytes. Thus, the digitized video signal in the display RAM 32 is modified by the computer 12. The modified digitized video signal is fed into the composite video encoder 38. The encoder 38 reconverts the modified digitized signal to an analog signal for broadcasting or recording in a conventional manner.

Figure 5:
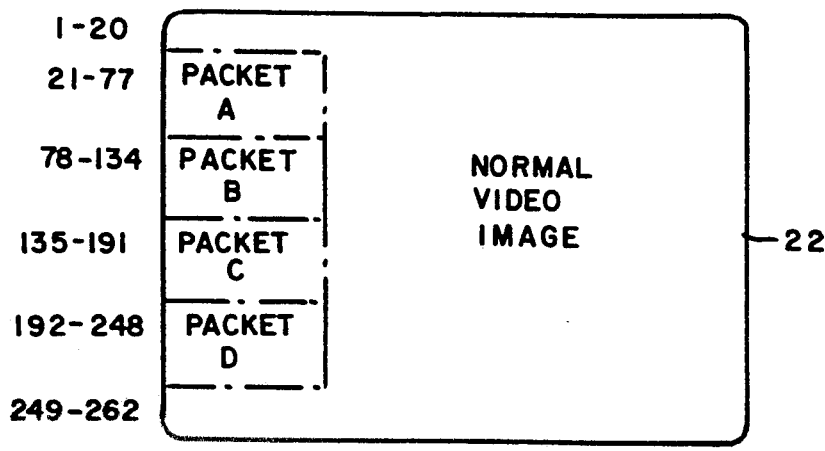
FIG. 5 is a representation of a television display using the system of the present invention.

This reconverted analog signal is received by a receiver 20 and fed to a television display device 22. When data has been loaded into the display RAM 32, a column on the left hand side of the picture is taken up by black and white pixels representative of the computer data sent through the video signal as illustrated in FIG. 5. The majority of the picture has been preserved as originally sent and appears to the right of the column of data. Alternative circuitry may be provided for working at higher speeds if it is desired to send the computer data only in the first few or last few horizontal lines which are not seen on the television screen. For the purposes of giving a demonstration simultaneously with sending a computer program and/or data for controlling a computer, the presently preferred embodiment is considered sufficient.

Figure 3:
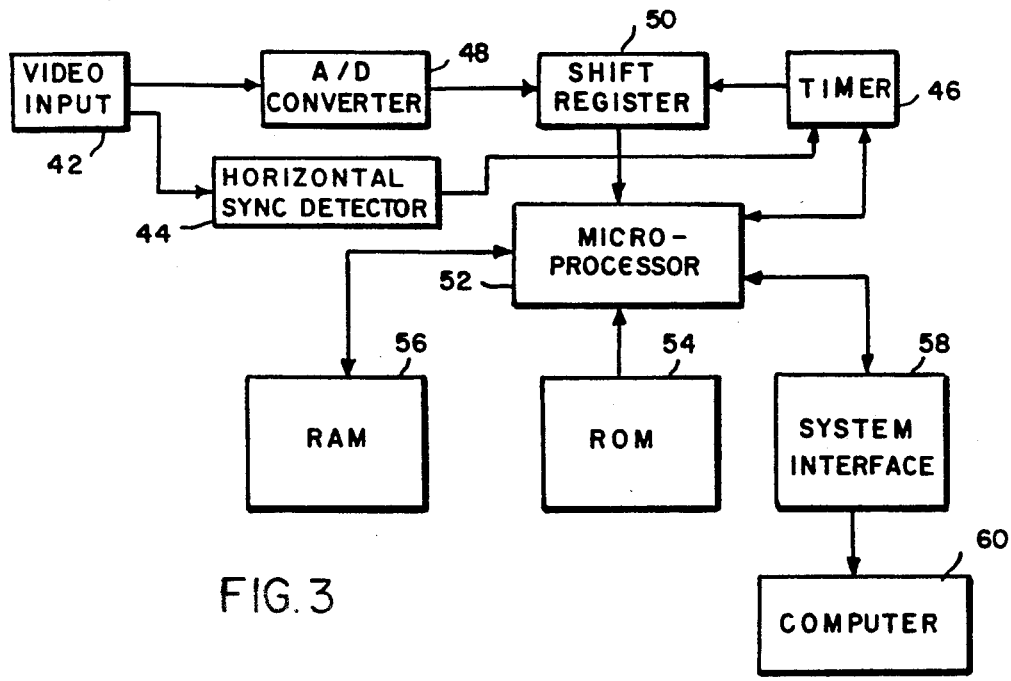
FIG. 3 is a schematic block diagram of the receiver portion of the system of FIG. 1.
Figure 4A:
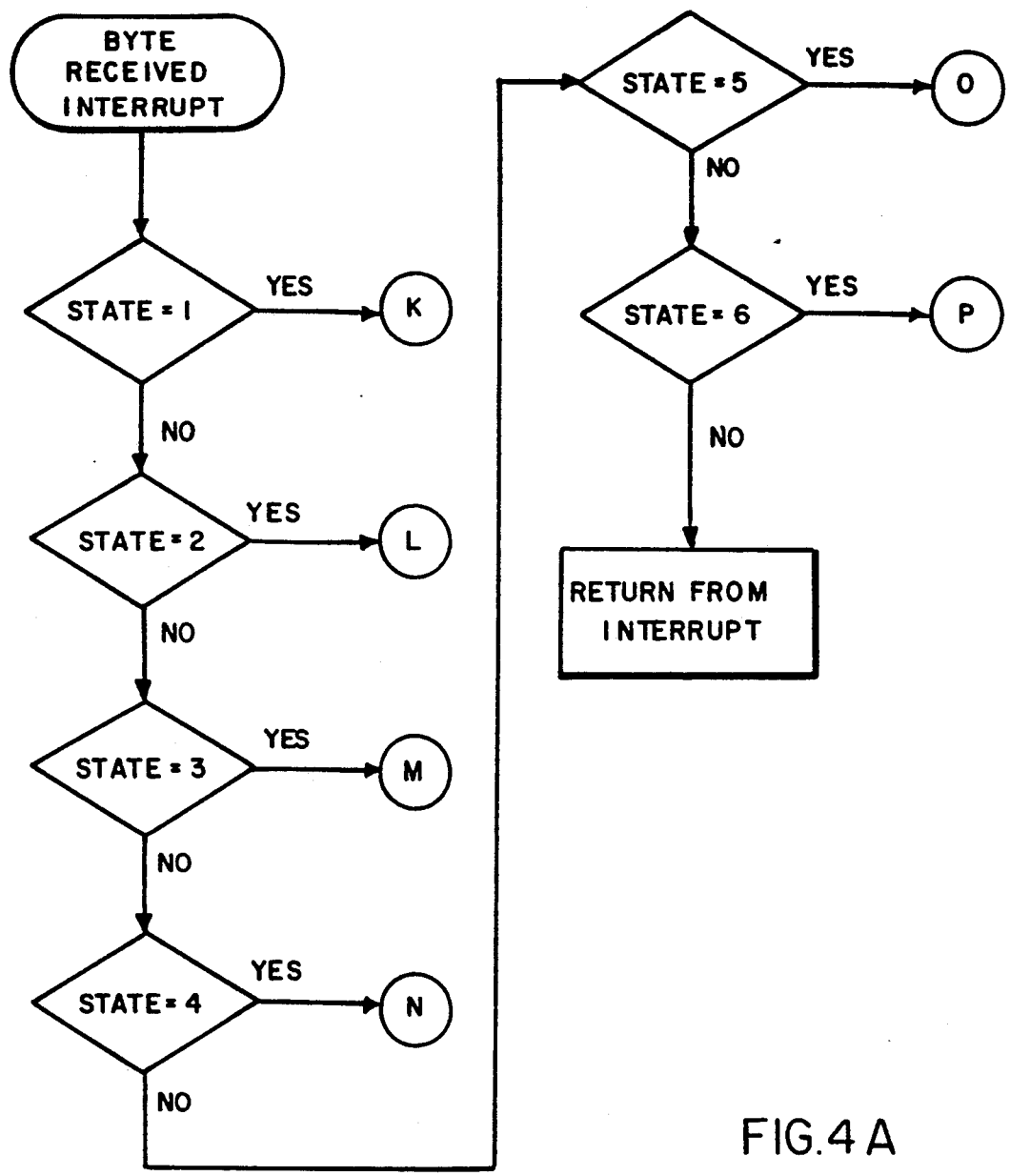
FIGS. 4 A–G are a flow chart of the method used by the receiver for extracting the digital computer data from the video signal.
Figure 4B:
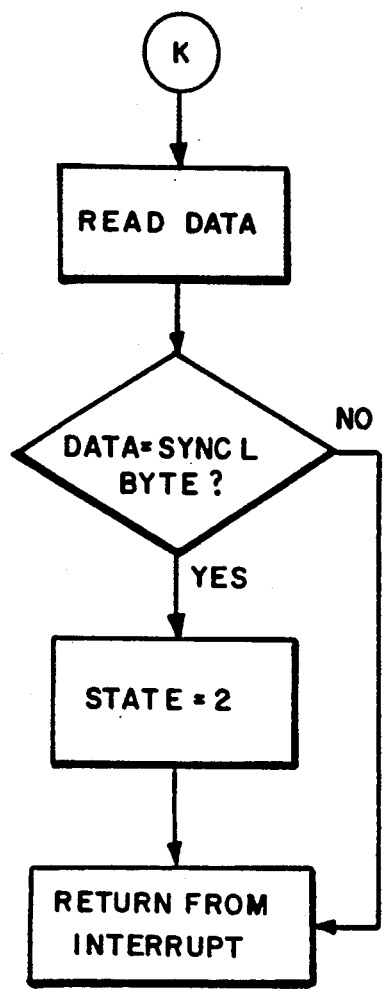
Figure 4C:
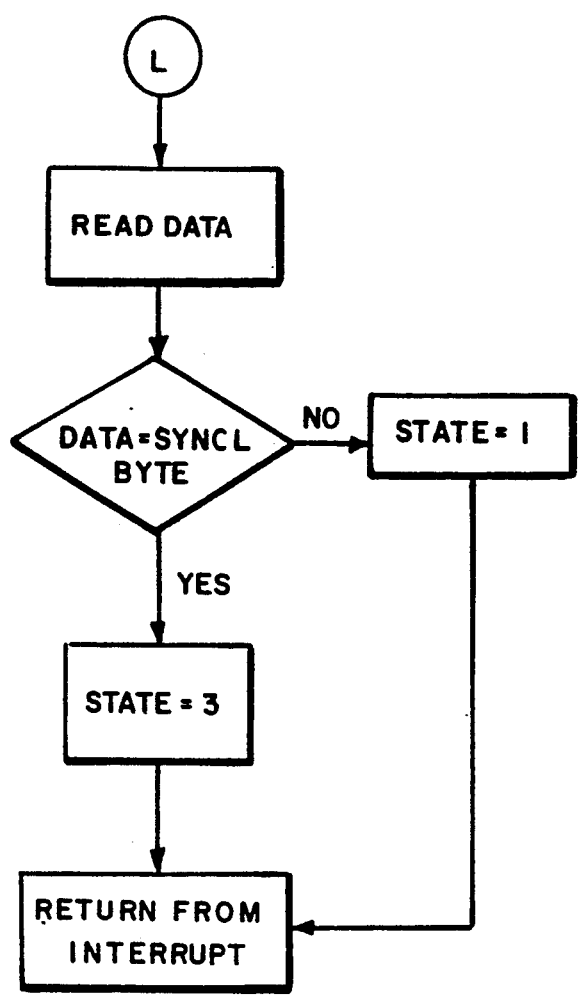

The received signal is also provided by the receiver 20 to a decoder circuit 26. The decoder circuit is shown in greater detail in FIG. 3. The video signal is received by the video input section 42 of the decoder circuit. A horizontal sync detector 44 monitors the received signal and provides an indication whenever a horizontal sync pulse is detected. A video signal provides a horizontal sync pulse at the beginning of each horizontal scan line. A timer 46 counts out a predetermined time delay following the appearance of the horizontal sync pulse. An A to D converter 48 is coupled to the video input 42 for the purpose of putting the received signal into digital form. The digital received signal is fed through a shift register 50. At the end of the time delay counted by timer 46, a first bit from the digital received signal is shifted into the shift register 50. Then the timer 46 counts out time intervals. The interval is 750 nanoseconds in the presently preferred embodiment to land near the middle of each 7 or 8 pixel representation of a data bit. When a time interval elapses on the timer 46, another bit from the digital received signal is shifted into the shift register 50.

Since according to the present system, 1 byte or 8 bits of data are sent on each horizontal scan line, it is only necessary that the information representative of each one of those 8 bits is extracted from the received signal. Thus, 7 intervals are counted out following the first bit. The initial time delay on the timer 46 should be calibrated so that the delay and the subsequent intervals are timed to pick out a bit from the middle of the seven or eight pixels representative of each computer bit. Since the entire length of the pixels representative of a bit should be all 1's or 0's, by selecting a bit from the middle as determined by the time intervals, it is likely to be interpreted correctly. The timing does not have to be exact since only one bit out of the entire length of signal corresponding to a bit is required to identify the bit's value. This accomodates any transmission delays which may affect the timing.

After 8 bits have been shifted into the shift register 50, the timer 46 generates an interrupt to a microprocessor 52. The microprocessor then has until the horizontal scan line is finished to retrieve the byte of computer data stored in the shift register 50. In communication with the microprocessor 52 is a RAM 56. The presently preferred embodiment provides an 8K RAM, half of which is used to store the decoder program for systematically storing the computer data bytes extracted from the video signal so that they can be meaningfully fed to a computer. The other half of the RAM 56 is used to temporarily store the decoded data bytes as they are received. Also in communication with the microprocessor 52 is a ROM 54 which contains a loader program. The ROM in the presently preferred invention is an 8K EPROM. The loader program is used to load a decoder program into the RAM 56. An interface 58 is provided so that the microprocessor 52 can send the decoded bytes to a computer 60. The design of the interface 58 is determined by the particular computer 60 which is being used in conjunction with the receiver circuit. The computer 60 may be any commonly available personal or other size computer.

A flow chart detailing the method employed by the microprocessor 52 in decoding the data as it is received from the shift register 50 is shown in FIGS. 4A-G. The decoder program depends on the structure of the data which is being sent through the video signal. In accordance with the presently preferred embodiment, the data is sent in four 57-byte packets between horizontal scan lines 21 and 248 as illustrated in FIG. 4. Each 57 byte packet is arranged as follows:

Byte 1-4: Sync Character 1
Byte 5: Sync Character 2
Byte 6-7: Block ID
Byte 8-55: Data
Byte 56-57: CRC Each packet begins with 5 bytes that are used to synchronize or identify the packet as a packet of computer data information as opposed to being merely a part of the video picture. These synchronization characters also signal to the microprocessor 52 the beginning of a packet of data. Thus, it is not necessary to rely upon counting the horizontal scan lines to determine the beginning. According to the presently preferred embodiment, a first synchronization character is repeated in bytes 1-4 and a second synchronization character is sent in byte 5.

The following two bytes are used in the presently preferred embodiment as identification bytes. These bytes identify the data being sent from among a number of different types of data. For example, the identification bytes may distinguish between keystroke data, program execution requests, data for calibration purposes, instruction for opening a file, instruction for closing a file and an instruction indicating that the data is to be filed away and indicating where in the file it belongs. 48 bytes of data follow the block identification bytes. The final 2 bytes are CRC bytes which in accordance with well known error detection methods are used to ensure that the packet was properly received. The 2 block identification bytes and the 48 data bytes make up the entire message which after being received, can be sent by the microprocessor 52 to the computer 60. Thus, advantageously, according to the present invention, computer control data such as keystrokes or other input and/or program execution requests which control the operation of a receiving computer, can be sent over a video signal. In addition, an entire program can be sent and filed into the computer after which the program may be operated and controlled from a remote location.

Referring back now to FIGS. 4A-G, it can be seen that the decoder program is specifically designed for the data structure of the presently preferred embodiment. The program begins in response to the byte received interrupt generated by the timer 46. The interrupt is generated by the timer 46 as discussed above after the eight bits comprising a data byte have been shifted into the shift register 50. The microprocessor has until the horizontal scan line reaches its end before it must obtain the byte from the shift register 50 and process it in accordance with the decoder program.

Initially, before any data bytes are received, a STATE byte is equal to 1. In response to the byte received interrupt, a microprocessor 52 compares the extracted 8-bit byte with the first synchronization character. If there is no match, see FIG. 4B, the program returns from the interrupt without changing STATE. If there is a match with the first byte and the synchronization character, STATE is set to 2. When the next byte is received, the program proceeds to FIG. 4C. The second extracted data byte is compared with the first synchronization character. If they do not match, the program returns the STATE to 1. If there is a match, the STATE is raised to 3.

Figure 4D:
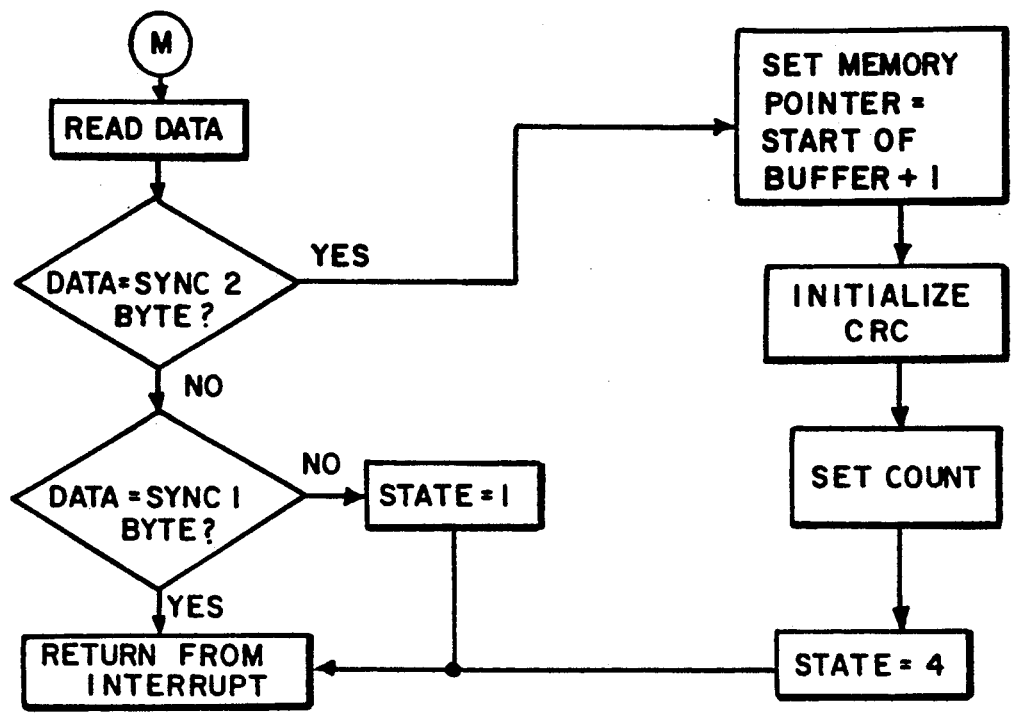
Figure 4E:
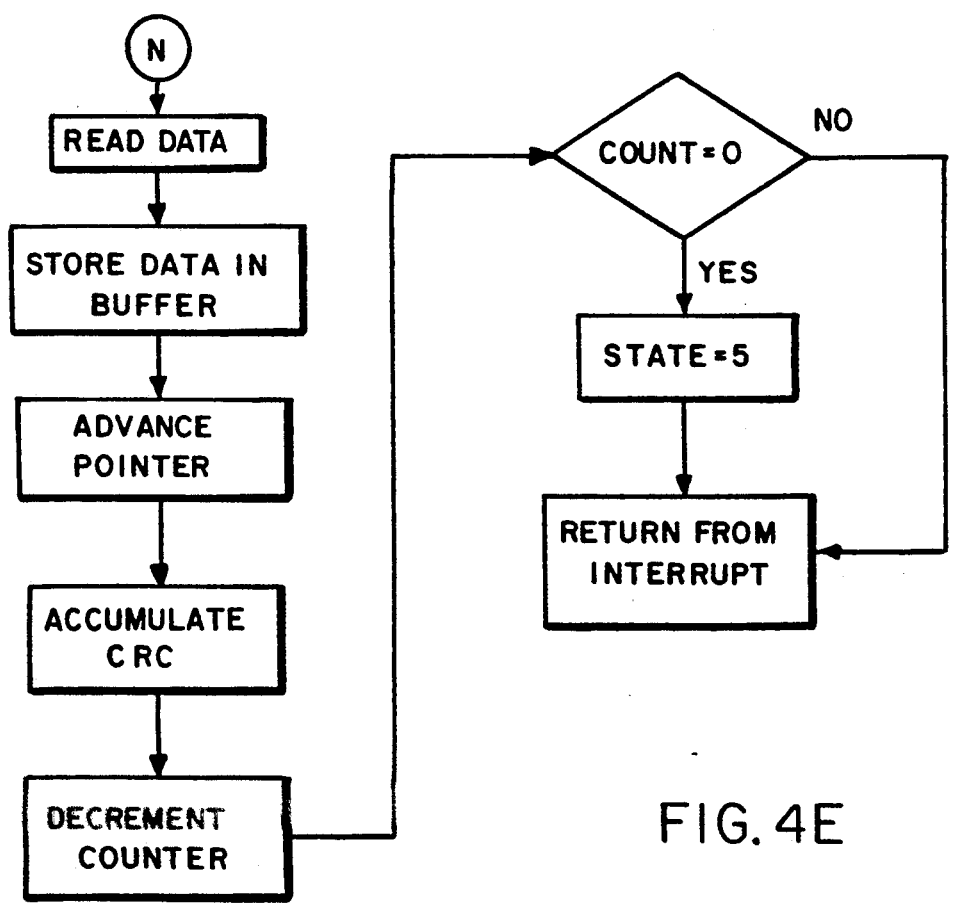

Referring now to FIG. 4D, the third and fourth bytes are compared with the second synchronization character. When they fail to match, they are compared with the first synchronization character. If there is a match, the program reiterates in STATE equal to 3. If neither of the synchronization characters is matched, STATE is returned to 1. The fifth byte should be successfully matched with the second synchronization character. Then the microprocessor knows to expect that a 50 byte message will immediately follow. A memory pointer identifies the location at which the next decoded data byte received by the microprocessor 52 is loaded into the RAM 56. The memory pointer is set equal to the start of an available buffer plus 1. There are 64 buffer areas in the RAM 56 into which the microprocessor 52 can store incoming data. The microprocessor 52 selects an available buffer when new data is being received. The CRC is initialized so that the error detection method can be used to verify that the data being received is correct. The count is set to the total of expected data bytes. In this case, the count is set to 50 since each packet includes 50 bytes of data. STATE is set to 4. Now the microprocessor 52 is ready to receive the data.

The data is read and then is stored in the RAM 56 at the location identified by the memory pointer. The memory pointer is then advanced to the next location and the CRC routine is performed on the received data. A counter is then decremented and checked to see if it has been reduced to 0. If not, the next byte of data is retrieved and read. After all the message bytes have been received, count equals 0 and STATE is set to 5.

Figure 4F:
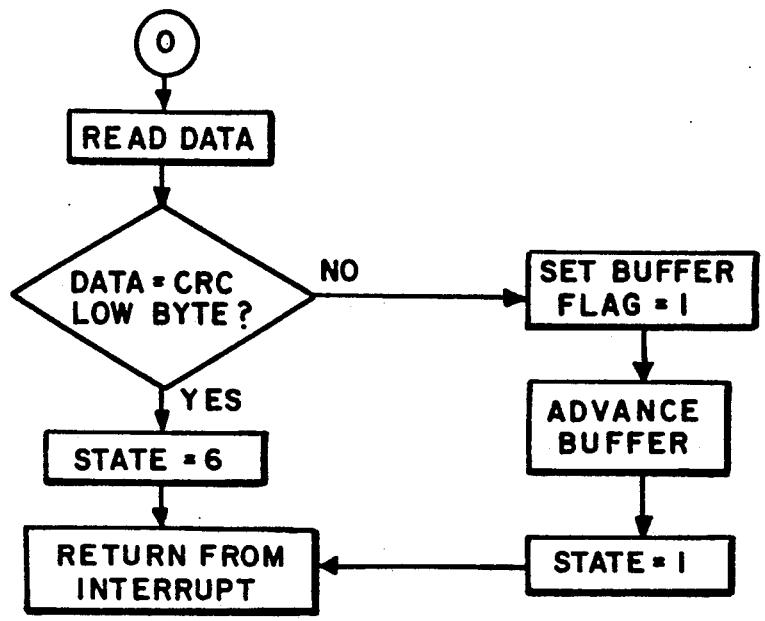
Figure 4G:
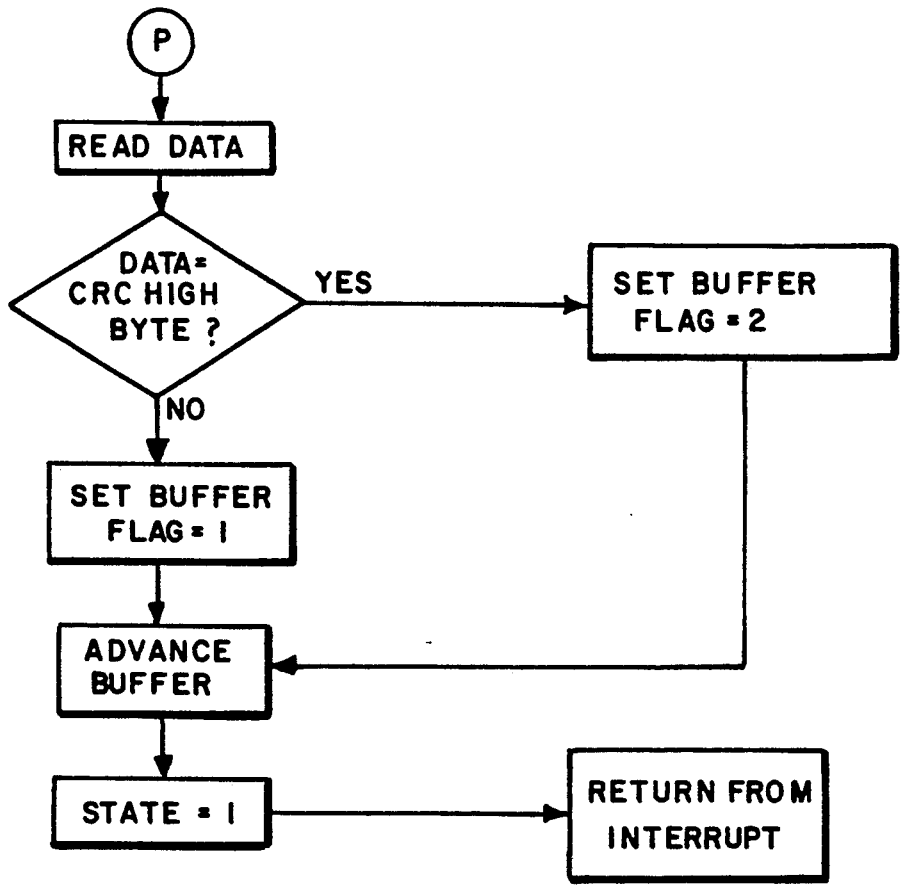

Referring now to FIG. 4F, the next byte is the CRC low byte. This data is read and compared with the CRC low byte calculated by microprocessor 52 and if they are not equal, a buffer flag is set equal to 1 to indicate that the data just received is inaccurate and should be ignored. The microprocessor then moves to the next available buffer in preparation for the next set of data. STATE is set back to 1 and the program goes back to looking for the first synchronization character. If the low CRC byte matches the computed CRC byte then STATE is set to 6. Referring now to FIG. 4G, when the next byte is read it is compared with the CRC high byte. If there is a match, then the buffer flag is set to 2, indicating that the data just received is correct and may be used. If there is no match, the buffer flag is set to 1 to indicate that the data received is incorrect. After the buffer flag is set, the buffer is advanced. STATE is then returned to 1 and the program is ready to look for the first synchronization character again.

Calibration of the timer 46 is performed by repeatedly sending packets of data at the transmission end in the normal fashion. The data may be random since its contents are relevant only to the extent of being sent along with a properly calculated CRC byte. At the receiving end, during calibration, the time delay between the horizontal sync pulse and the extraction of the first data bit is set at a predicted value expected to correctly land in the middle of the pixels representing a data bit. Calibration data is received for a number of iterations using the predicted time delay value. During the iterations, the number of correctly received packets of data is counted. Then the time delay is changed and the same number of iterations are performed, counting the number of correctly received packets of data. This is repeated for a number of different values until unacceptable values are determined at the long and short side. Once the range of acceptable values has been determined, a value halfway between the first unacceptable long value and first unacceptable short value is selected.

Once data has been correctly received by the RAM 56, if that data is identified in the block ID as a keystroke it will be input over the system interface 58 and the computer 60 will be controlled by it just as it would be if a user had hit the corresponding key on the keyboard directly connected to the computer. Likewise, if the block ID indicates that the data contains a progam execution command, that will be input to the computer over the system interface 58 and the computer will execute a program just as it would if a user had typed out the command for executing the program on the keyboard connected to the computer 60. Thus, the control of the computer can be performed remotely through a broadcast over a video signal. Advantageously, this can be performed at the same time that a video picture is being displayed on the television screen. This provides a visual and oral presentation at the same time that the computer is being controlled to demonstrate a program. The program itself may have been transmitted through the video signal and filed into the computer using the system of the present invention.

Of course, it should be understood that various changes and modifications to the preferred embodiment described above will be apparant to those skilled in the art. For example, a system could be developed which would send more than one byte of data per horizontal scan line which would require faster receiver hardware to extract the data as the video signal is received. In such a system the data could be sent over horizontal lines which do not appear on the television screen, thus avoiding cutting into the viewed video display picture. Furthermore, it is not necessary that the pixels representative of the data appear as black or white, any colors will suffice. It is preferable however that each data bit be represented by all 1's or all 0's. These and other changes can be made without departing from the spirit and the scope of the invention and without diminishing its attendant advantages. It is therefore intended that such changes and modifications be covered by the following claims.

I claim:

1. A method for simultaneously providing a video picture and controlling a computer comprising the steps of:

providing a video program on a video signal;

modifying the video signal to create a modified video signal by replacing portions of said video signal with digital signal portions representative of computer data for operating a computer program;

sending the modified video signal;

receiving the modified video signal;

displaying a video picture corresponding to the modified video signal so as to at least substantially permit viewing of the video program;

converting the modified video signal to form a digital received signal;

extracting digital bits from the digital signal portions representative of computer data; and automatically inputting the digital bits into a computer so that the digital bits automatically control the computer so as to operate the computer program in response to the digital signal portions in the modified video signal simultaneously with viewing the video program in the modified video signal.

2. The method of claim 1 further comprising the step of recording the modified video signal on a recording medium and wherein said step of receiving is accomplished by playing back said recording medium.

3. The method of claim 1 wherein the step of modifying the video signal includes substituting digital signals portions corresponding to a single digital bit for the portions of said video signal corresponding to a plurality of pixels.

4. The method of claim 1 wherein the displayed video picture includes black or white pixels in the locations in which digital signal portions representative of computer data were substituted for digital signal portions representative of video pixels.

5. The method of claim 1 wherein said step of modifying further includes arranging said digital signal portions into packets of bytes, each packet including at least one sync byte, at least one identification byte, a plurality of data bytes and at least one error detection byte.

6. The method of claim 5 further comprising after the step of extracting:
   locating said packets by identifying the at least one sync byte; and
   reading the at least one identification byte in each said packet to determine how to treat the data bytes in said packet, said identification byte distinguishing from among instructions for loading or operating a computer program consisting of a group of instructions including at least keystroke data, program execution requests and instructions to file data.

7. The method of claim 1 wherein the digital signal portions representative of computer data further include computer data representative of the computer program and instructions for loading the program and wherein said step of automatically inputting causes the computer to automatically load the computer program as controlled by the digital signal portions introduced in said step of modifying the video signal.

8. A method for demonstrating a computer program comprising the steps of:
   providing a video program on a video signal;
   modifying the video signal to create a modified video signal by replacing portions of said video signal with digital signal portions representative of a computer program and computer instructions for operating said program;
   broadcasting the modified video signal;
   receiving the modified video signal at a plurality of remote locations such that at each of said remote locations the following steps occur:
      displaying a video picture corresponding to the modified video signal so as to at least substantially permit viewing of the video program;
      converting the modified video signal so as to extract digital bits from said digital signal portions; and
   automatically inputting said digital bits into a computer so as to provide said computer with the computer program and automatically operate the program in response to the computer instructions while the video program is being viewed wherein the automatic operation of the program is controlled by the digital signal portions introduced in said step of modifying the video signal.

9. The method of claim 8 wherein said step of modifying further includes arranging said digital signal portions into packets of bytes, each packet including at least one sync byte, at least one identification byte, a plurality of data bytes and at least one error detection byte.

10. The method of claim 9 further comprising after the step of converting:
   locating said packets by identifying the at least one sync byte; and
   reading the at least one identification byte in each said packet to determine how to treat the data bytes in said packet, said identification byte distinguishing from among instructions for loading or operating a computer program consisting of a group of instructions including at least keystroke data, program execution requests and instructions to file data.

11. A method for viewing a video program in conjunction with a computer demonstration comprising the steps of:
   receiving a modified video signal containing a video program and computer data;
   displaying a video picture corresponding to the modified video signal so as to substantially permit viewing of the video program;
   converting the modified video signal to form a digital received signal;
   extracting digital bits from the digital received signal corresponding to said computer data; and
   automatically inputting said digital bits into a computer so that said digital bits automatically control the computer wherein said computer operates in response to the computer data in the modified video signal simultaneously with viewing the video program in the modified video signal.

12. The method of claim 11 further comprising the step of recording the modified video signal on a recording medium and wherein said step of receiving is accomplished by playing back said recording medium.

13. The method of claim 11 further comprising the step of broadcasting said modified video signal.

14. The method of claim 11 wherein said computer data includes identification data and further comprising after the step of extracting:
   reading the identification data to determine how to treat the computer data, the identification data distinguishing from among instructions for loading or operating a computer program consisting of a group of instructions including at least keystroke data, program execution requests and instructions to file data.

15. A method of creating a combination video program and computer demonstration comprising:
   putting a video program on a video signal with color information for each pixel in a video picture;
   providing a stream of computer data to spontaneously control automatic loading of a computer program and to spontaneously control automatic operation of said computer program;
   modifying the video signal to create a modified video signal with digital signal portions representative of the stream of computer data; and
   broadcasting the modified video signal so that a plurality of decoder-equipped computers receiving the broadcasted modified video signal are spontaneously controlled by the computer data stream.

16. The method of claim 15 wherein said step of providing further includes arranging said stream of computer data into a series of packets, each packet including at least one identification byte and a plurality of data bytes, the identification byte distinguishing from among at least keystroke data, program execution requests and instructions to file the data bytes.

17. A method for remotely controlling a computer over a video signal comprising the steps of:
   providing a video signal;
   modifying the video signal to create a modified video signal by replacing portions of said video signal with digital signal portions representative of computer data for operating a computer program;
   sending the modified video signal;
   receiving the modified video signal;
   converting the modified video signal to form a digital received signal;

extracting digital bits from the digital signal portions representative of computer data; and automatically inputting the digital bits into a computer so that the digital bits spontaneously and automatically control the computer so as to operate the computer program.

18. The method of claim 17 further comprising the step of recording the modified video signal on a recording medium and wherein said step of receiving is accomplished by playing back said recording medium.

19. The method of claim 17 wherein the step of modifying the video signal includes substituting digital signal portions corresponding to a single digital bit for the portions of said video signal corresponding to a plurality of pixels.

20. The method of claim 17 wherein said step of modifying further includes arranging said digital signal portions into packets of bytes, each packet including at least one sync byte, at least one identification byte, a plurality of data bytes and at least one error detection byte.

21. The method of claim 20 further comprising after the step of extracting:

locating said packets by identifying the at least one sync byte; and reading the at least one identification byte in each said packet to determine how to treat the data bytes in said packet, said identification byte distinguishing from among instructions for loading or operating a computer program consisting of a group of instructions including at least keystroke data, program execution requests and instructions to file data.

* * * * *